A. C. Semple,
Mill Gearing.
No. 5647.  Patented June 27, 1848.

UNITED STATES PATENT OFFICE.

A. C. SEMPLE, OF CINCINNATI, OHIO.

RACK AND PINION.

Specification of Letters Patent No. 5,647, dated June 27, 1848.

*To all whom it may concern:*

Figure 1:
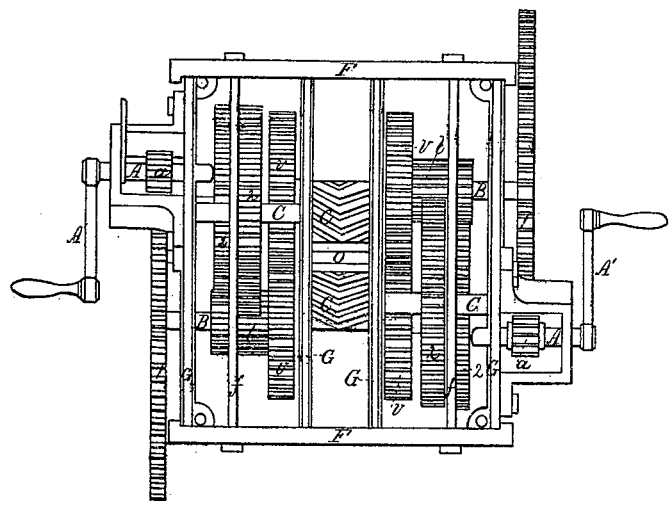

Be it known that I, AMZI C. SEMPLE, of Cincinnati, in the county of Hamilton and State of Ohio, have invented a new and useful form of teeth or cogs to be used in the racks and pinions and otherwise for various purposes, by which a great increase of strength, as well as accuracy of motion, is secured over any other form now in use; and I do hereby declare that the following is a full, clear, and exact description of the construction and operation of the same, reference being had to the annexed drawings, in which my form of cogs or teeth are exhibited as applied to a press, Figure 1, in the drawings, making a part of this specification, and more particularly Figs. 4 and 7, which exhibit a diagonal form, and Figs. 6 and 8, which show the arched or curved form of teeth or cogs, and my invention consists in constructing such teeth or cogs essentially in a curved or diagonal form as therein set forth, by which it will be seen that the cogs or teeth meshing together when subjected to a heavy pressure incline, the center of the one to the center of that into which it works, thus securing a true and accurate motion, the base of each cog or tooth at the same time occupying a greater surface upon the rack or periphery of a wheel is rendered much stronger by such peculiar construction.

What I claim as my invention, and desire to secure by Letters Patent, is—

Figure 4:
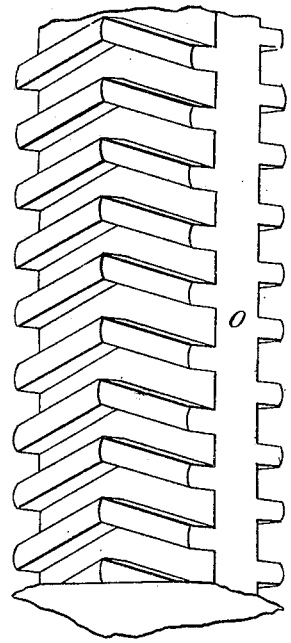
Figure 5:
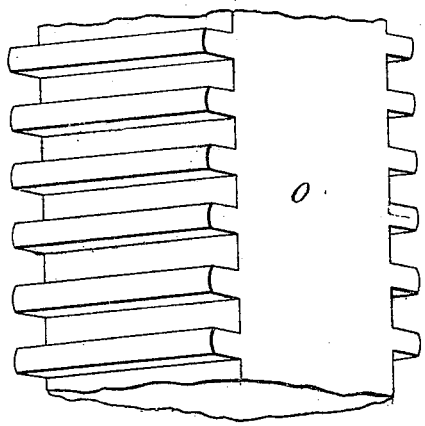
Figure 6:
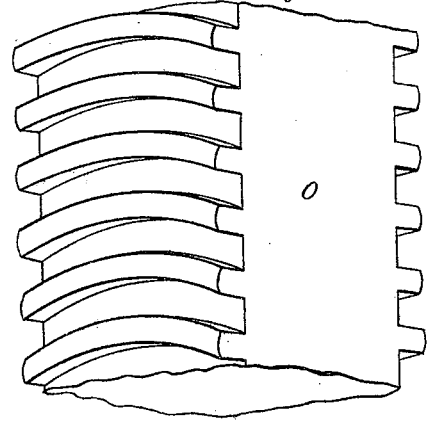
Figure 7:
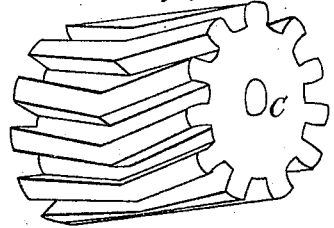
Figure 8:
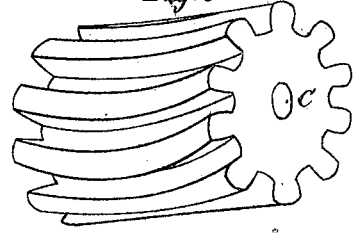

The form of the teeth or cogs, both in the rack and in the pinion meshing into the same; either diagonal as in Figs. 4 and 7 or arched or curved as in Figs. 6 and 8, whereby strength and accuracy of motion are the better secured as herein described.

A. C. SEMPLE.

Witnesses:
I. BIGELOW,
S. A. PEUGH.